March 10, 1970  V. I. ROBERTS ET AL  3,499,314
APPARATUS FOR TESTING COVERS
Filed Feb. 12, 1968  4 Sheets-Sheet 1

VICTOR I. ROBERTS
MAYNARD H. RIDDELL
INVENTORS

BY *Charles L. Parsons*

ATTORNEY

FIG. 3
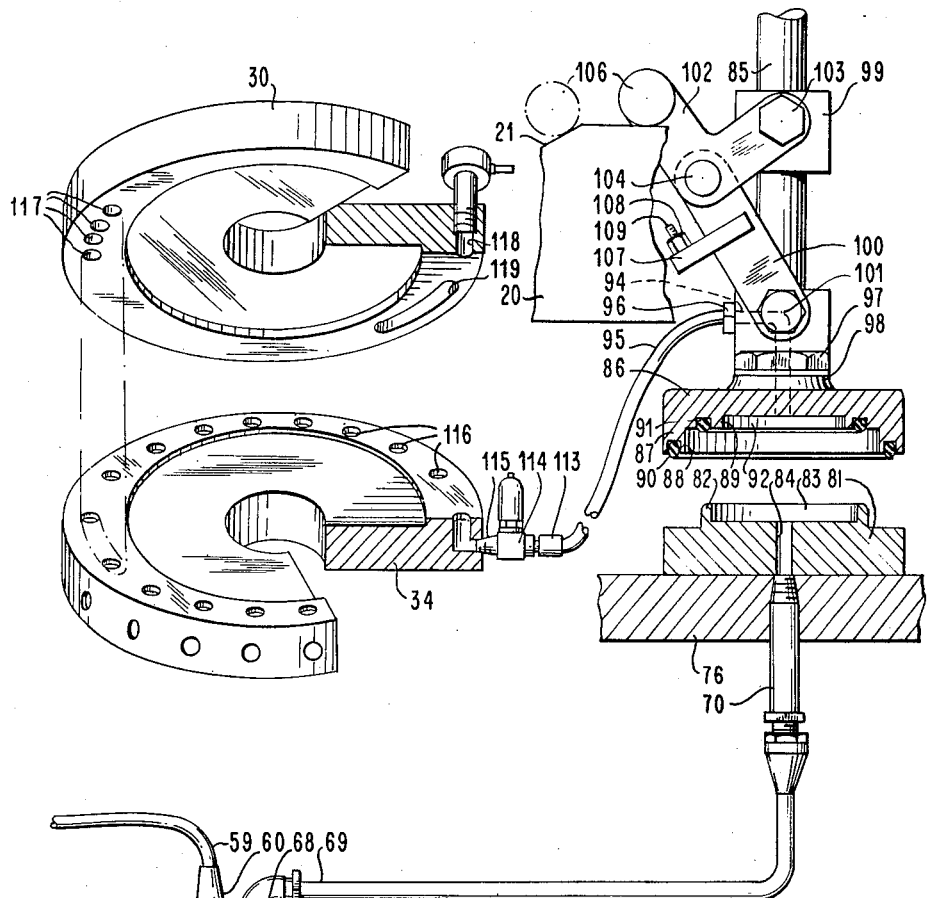
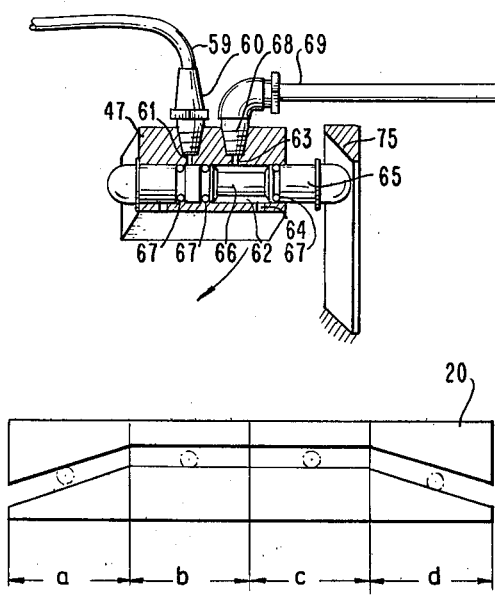
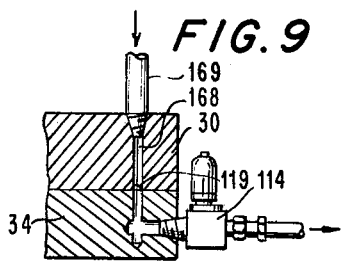
FIG. 9
FIG. 8
VICTOR I. ROBERTS
MAYNARD H. RIDDELL
INVENTORS
BY
ATTORNEY March 10, 1970  V. I. ROBERTS ET AL  3,499,314
APPARATUS FOR TESTING COVERS
Filed Feb. 12, 1968  4 Sheets-Sheet 3

INVENTORS
VICTOR I. ROBERTS
MAYNARD H. RIDDELL
BY
Charles L. Parsons
ATTORNEY

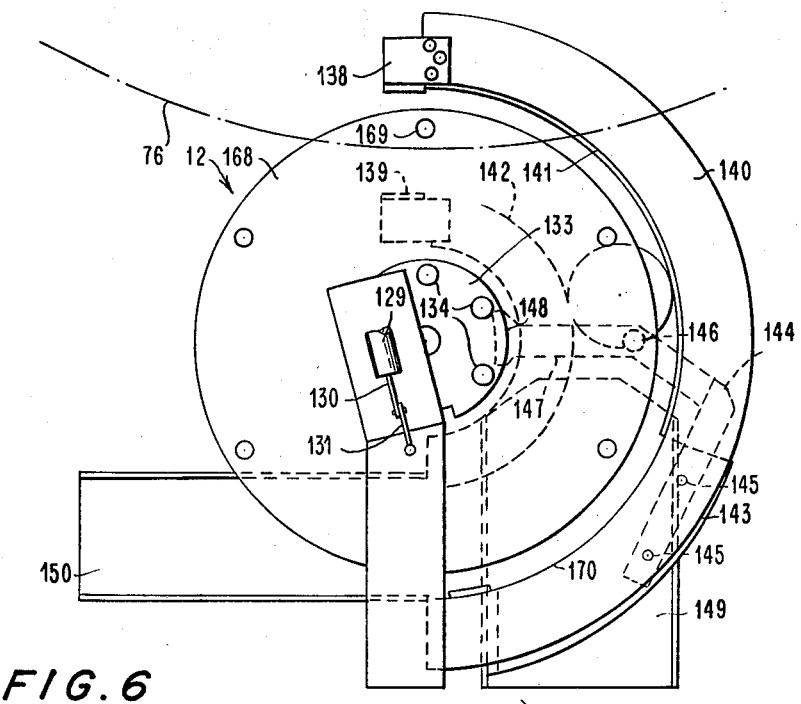
FIG.6
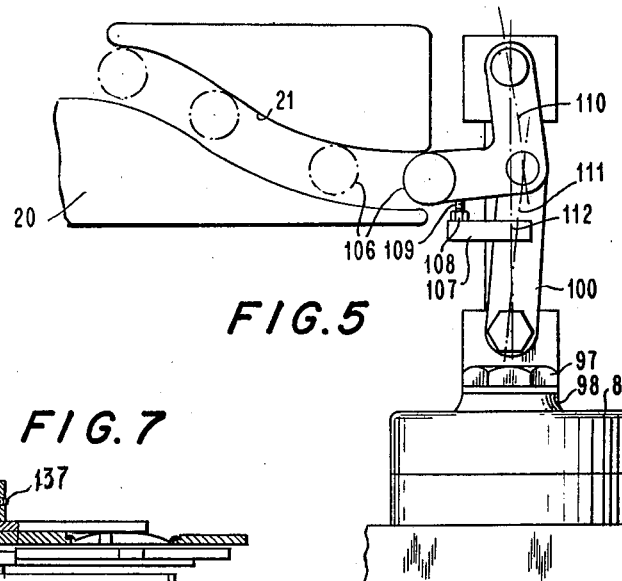
FIG.5
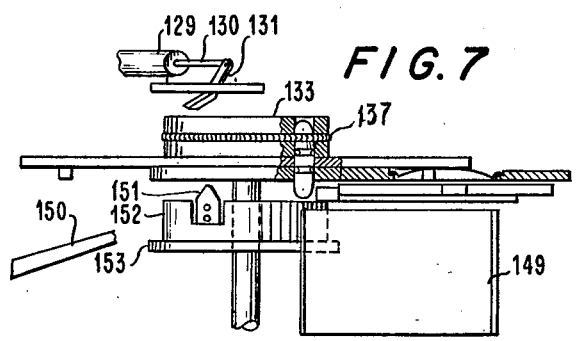
FIG.7
INVENTORS
VICTOR I. ROBERTS
MAYNARD H. RIDDELL
BY
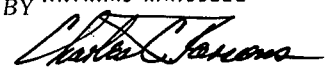
ATTORNEY United States Patent Office 3,499,314
Patented Mar. 10, 1970

3,499,314
APPARATUS FOR TESTING COVERS
Victor Isaac Roberts and Maynard Harry Riddell, Randolph, N.Y., assignors to The Borden Company, New York, N.Y., a corporation of New Jersey
Filed Feb. 12, 1968, Ser. No. 704,610
Int. Cl. G01m 3/04
U.S. Cl. 73—45.2         5 Claims

ABSTRACT OF THE DISCLOSURE

Apparatus for high pressure testing covers for cans or the like. A cover is placed into a cell such that the cover divides the cell into first and second sections. A source supplies high-pressure gas into the first section while concurrently the second section is connected to the atmosphere. A sensor communicating with said second section indicates a leak in the cover. A sorting mechanism responsive to a pressure buildup in the second section ejects leaky covers.

BACKGROUND OF THE INVENTION

Heretofore, various apparatus have been used for testing materials such as covers or the like by introducing a gas into a confined area in which the cover is placed and recording the seepage or leakage of the gas through the material being tested. Notably, the Blaing-Lesik Patent No. 2,696,107 sets forth a testing apparatus for detecting leaks in clipped can ends and ejecting those which prove to be leaky. However, none of the testing devices known to the prior art have concerned themselves with testing the material for leaks by introducing high-pressure gas into the confined area and sensing seepage through the cover thus being tested. Obviously, leaks which would otherwise fail to be disclosed under low-pressure testing conditions would be readily discernible by high-pressure testing, since the cover itself would tend to flex and even the slightest leak which permits slow seepage would be perceptible by the sensing means. Despite the obviously desirable results which would be obtained by high-pressure testing, the prior art has been unable to suggest such an apparatus because the sensing means of the tester would detect a buildup in pressure occasioned by the flexing or "oil canning" of the cover being tested in the confined area and thus the cover would be rejected as leaky due to this buildup of pressure which the sensing means would take for leakage. Moreover, the buildup of pressure which occurs due to flexing of the cover is generally of such intensity that conventional sensing means used in testers would be damaged. Additionally, the hardware heretofore used in the prior art cover testers such as cell mountings, seals and the like has been unable to cope with the forces transmitted by the introduction of a high-pressure gas within the confined area of testing.

SUMMARY OF THE INVENTION

The present invention contemplates an altogether new method of testing can covers by utilizing a high-pressure gas testing media heretofore found unsuitable in known testing apparatus. More particularly, by utilizing a high-pressure gas media, it has been found that a substantial flexing of the can or cover is effected and this results in a more complete testing of the cover for seepage therethrough before it is seated and secured on the end of the can with which it is to be used. Moreover, the present apparatus has proven extremely satisfactory in the testing of newer types of can covers having tear-away strips or scored sections for tear-away lids currently finding widespread acceptance in the market place on the tops of beverage cans and the like.

Briefly stated, the present invention comprises a cell wherein the cover to be tested is placed so as to divide the cell into two portions, means for supplying high-pressure gas into one of the portions, means for purging the other portion to atmospheric pressure, the purging and supplying functions being synchronized to take place simultaneously and thereby induce the cover to flex, sensing means for testing the cover for leakage of the gas into the said other portion, means for discharging the gas from the first portion from the said one portion, and sorting means responsive to said sensing means for ejecting any cover which leaks.

BRIEF DESCRIPTION OF THE DRAWINGS

The various features of the apparatus of this invention will become apparent from the following detailed description set forth in connection with the accompanying drawings which relate to the preferred embodiment of the present invention and are given by way of illustration.

FIGURE 3 is a detailed view of the high-pressure testing apparatus of the present invention with the valve in the exhaust position.

FIGURE 5 is a perspective view of the test chamber in the closed position.

FIGURE 6 is a top perspective view of the sorting apparatus of the present invention.

FIGURE 7 is a side perspective view of the sorting apparatus partially broken away to show salient features thereof.

FIGURE 8 is a flat, expanded projection view of the arcuate cam of the present invention.

FIGURE 9 is a detailed view of the low-pressure release valve of the present invention.

DETAILED DESCRIPTION OF THE INVENTION

Figure 1:
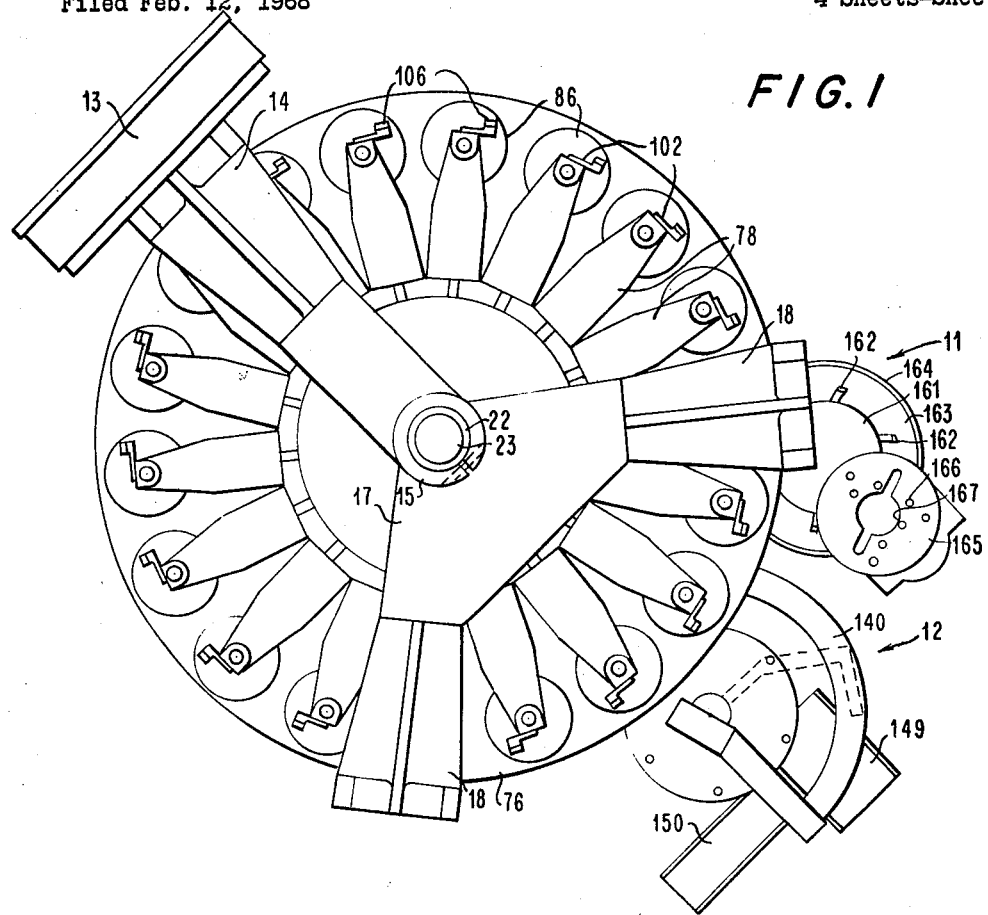
FIGURE 1 is a top perspective view of the preferred embodiment of the present invention.

Referring now to the preferred embodiment of the present invention, and more particularly to the illustration of FIGURE 1, there is shown a high-pressure cover tester 10 which includes feeding apparatus 11 and sorting apparatus 12. The cover tester may be suitably supported on a frame, legs or the like (not shown), and includes support members 18 having a horizontally projecting brace 14. The brace 14 includes a cylindrical center section 15 with an opening for receiving an upwardly projecting sleeve assembly 22. The opening is suitably split to clamp rigidly onto the sleeve assembly and prevent it from turning with shaft 23. The supporting brace 14 includes a horizontally disposed gusset 17, which terminates in two L-shaped bracing members 18 spaced 120° from one another in the horizontal plane. The free ends 19 of the L-shaped bracing members project downwardly and mount a two-section semicircular cam surface 20. The two sections define a cam slot 21 therebetween which opens at both ends as is shown in the flat, expanded projection view of FIGURE 8.

Figure 4:
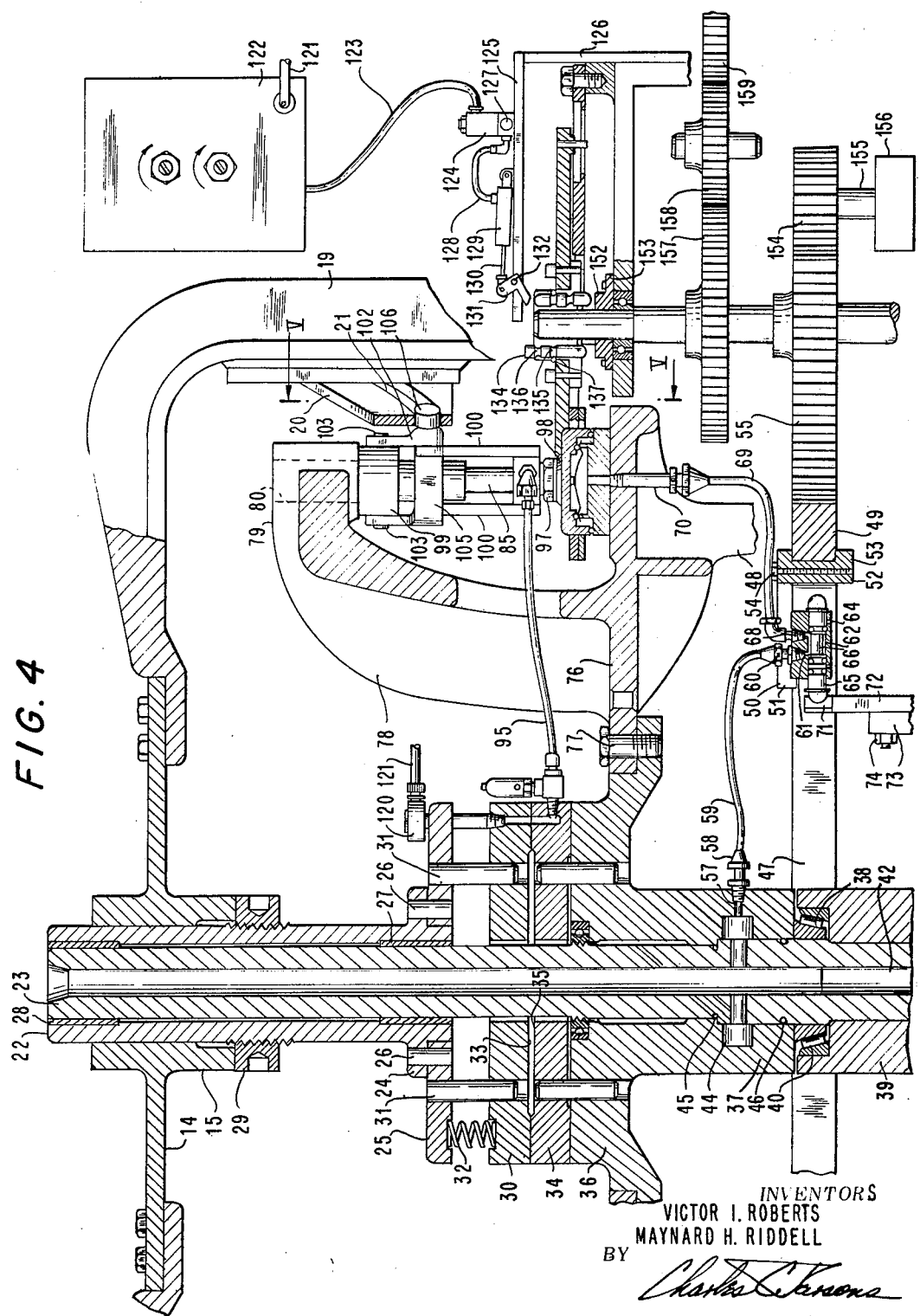
FIGURE 4 is a transverse cross-sectional view of the high-testing apparatus illustrating the valve in the test position.

The vertically disposed sleeve assembly 22 shown in detail in FIGURE 4 includes a hollow, rotating inner shaft 23. The fixed sleeve assembly extends downwardly along the hollow shaft and terminates in an outwardly flared flange portion 24. Mounted on the sleeve 22 adjacent the flange portion 24 is a circular disk 25 which is secured to the flange by pins 26 projecting through vertically aligned bores provided in the flange and the supporting disk and suitably secured therein. Bearings 27 and 28 are provided between the sleeve 22 and the hollow shaft portion 23 to stabilize the two members. The cylindrical portion 15 of brace 14 allows the sleeve assembly 22 to be adjusted vertically by threaded collar 29 to apply sealing pressure to valves 30 and 34, as will appear hereinafter. Coaxially disposed with respect to shaft 23 and spaced vertically beneath the supporting disk 25 is a stationary valve portion 30. The valve member 30 is prevented from moving relative to the supporting disk member 25 by pins 31 which are provided in vertically aligned bores in both members. Angularly spaced about the adjacent faces of the disk 25 and valve member 30 are a plurality of biasing springs 32 which insure that an equally distributed downward force is exerted on the valve member 30 for reasons to be hereinafter set forth. Juxtaposed with valve member 30 and also coaxially arranged with respect to shaft 23 is a rotary valve member 34 which forms an air-tight interface with the stationary valve 30 at the outer portion thereof; both valve members include recessed portions 33 and 35 provided adjacent the shaft member 23. The rotary valve 34 rests on an annular support member 36 which includes an outward horizontally projecting annular flange and a downwardly projecting sleeve portion 37. The sleeve 37 is mounted for rotation with shaft 23 and rests on a tapered annular flange 38 provided on the shaft. The rotary valve 34 and the support member 36 are secured together for concurrent rotary motion by pins provided in vertically aligned bores in both members. Spaced vertically beneath the sleeve portion 37 of the support member 36 is a fixed sleeve portion 39 having an upper tapered counterbore into which the annular flange 38 is received. Thrust bearings 40 are provided in the counterbore to mount the support member 36 for rotation and additional bearings are suitably provided to permit member 36 to move with shaft 23. The shaft 23 is provided with a longitudinal bore 42 which receives a gas under high pressure from a conventional source (not shown) through the bottom thereof and is plugged at the top to prevent escape of the gas. Preferably, a gas under a pressure of about 80 p.s.i. is used. Angularly spaced horizontal bores 43 are provided about the periphery of the hollow shaft 23 which allows communication of the bore 42 with manifold 44 in sleeve 37. To insure that the gas supplied to the manifold 44 does not escape along the interface of the shaft 23 and the sleeve 37, conventional O-rings 45 and 46 are provided, as shown in FIGURE 4. An annular ring 47 concentric with the axis defined by shaft 23 is provided and is suspended in relation thereto in a manner to be more specifically set forth. Disposed in the same horizontal plane of the ring 47 and having a greater inner diameter is an annular ring gear 49 having teeth about the periphery thereof. The ring gear 49 is suitably secured to the annular disk 47 by spaced interconnecting strip 50 having a flange portion 51 welded or otherwise affixed to the annular ring 47. L-shaped members 52 having flanges 53 which contact the lower surface of gear 49 are secured to the horizontally disposed connecting strips 50 by suitable means such as bolts 54. The gear 49 is grasped between flange 53 and the free end of strip 50 and therefore the ring 47 and annular ring gear 49 are secured for common rotational movement. A plurality of angularly spaced bosses 48 on an annular support member 76 connected to member 36 are welded to the upper surface of gear 49 and suspend the gear and ring assembly 47, 49 therebeneath, as well as assuring rotational movement of the assembly and the support member. A spur gear 55 is fixedly mounted on an upwardly disposed rotatable shaft 56 and meshes with the annular gear 49. The spur gear 55 also meshes with a spur gear 154 mounted on the armature 155 of a motor means 156 which may be of a well-known type. For example, a pneumatic, hydraulic or electric motor will service to drive the spur gear 154. It should be appreciated that other elements mounted on shaft 56 will be driven in timed relationship with the rotating support member 36 as the description herein progresses.

In the preferred embodiment, a plurality of testing units are provided, each of which comprises a spool valve arrangement in the ring 47 which controls the flow of high-pressure gas from the manifold 44 to a testing cell mounted on the annular support member 76. Therefore, each unit is angularly spaced about the axis defined by the shaft 23 and is moved along a circular path of travel as the ring 47 and support member 36 rotate. Reference hereinafter will be made to the elements of only one of the testing units of the preferred embodiment, it being understood that each of the units is structurally the same. Each test unit includes a conduit 59 which communicates with the manifold 44 through a bore 57 provided in the sleeve 47 and radially aligned with the valve and cell assemblies of the unit. A conventional fitting 58 connects the conduit to the bore 57 and the free end of the conduit is provided with a fitting 60 which directs the flow of gas to a vertically disposed inlet port 61 in ring 47, as is best seen in FIGURE 3. The port 61 communicates directly to an enlarged, transverse bore 62 which receives the test unit spool valve assembly. Spaced laterally from the port 61 and also communicating with transverse bore 62 are ports 63 and 64, the former being an outlet passage from the transverse bore 62 to the test chamber and the latter being open to the atmosphere to drain high-pressure gas from the unit when desired. A cylindrical spool 65 having an inwardly recessed portion 66 near the midpoint thereof is slidably received within the bore 62 and includes conventional stops at both ends thereof to limit the movement between two extreme positions in the bore seen in FIGURES 3 and 4. Conventional O-rings 67 are mounted on the spool 65 on both sides of the recessed portion 66 with an additional O-ring spaced from the detent portion on the same side of the spool as inlet port 61. The spool is normally situated in one or the other of its two extreme positions and the O-rings serve to prevent the escape of gas along the interface of the spool 65 and the bore 62, as well as directing the flow of the high-pressure gas received in port 61 to the port 63 in the test position illustrated in FIGURE 4 and conversely, to close off port 61 and allow the gas conveyed through port 63 to flow back and out drain port 64 to purge the cell of the test unit to atmospheric pressure in the exhaust position shown in FIGURE 3. A conduit 69 receives the flow of high-pressure gas through port 63 when the spool valve is in the test position and is connected to the port 63 by a conventional L-fitting 68. At the other end of the conduit is a conventional tube fitting 70 which is mounted in an aperture provided in support member 76. Since the flow of gas to or from the fitting 70 is governed entirely by the position of the spool valve 65, it is important to note how the spool valve is moved between its two positions. In the test position of the valve shown in FIGURE 4, there is illustrated a cam member 71 integrally formed on the support 72. The support is mounted on a fixed upright brace 73 by bolt 74 adjacent the inner edge of ring 47. Thus, as the ring 47 is rotated, the spool valve 65 in the test position of FIGURE 4 contacts the cam 71 and is moved laterally outwardly in the transverse bore to the exhaust position illustrated in FIGURE 3. Cam member 75, illustrated in FIGURE 3, is located at another point along the path of rotational movement but between the outer edge of the ring 47 and the inner edge of gear 49, and is contacted when the spool valve 65 is to be shifted inwardly back to the test position. The annular support member 76 is secured to the annular flange of member 36 at spaced points by bolts 77. The support member includes a plurality of goosenecks 78 angularly spaced thereon, one gooseneck for each testing unit. Each gooseneck terminates in a horizontally disposed portion 79 having a vertical bore 80 provided therein.

Referring now to the chamber or cell of the subject test unit, there is shown a circular base 81 secured to support member 76 having a circular lip 82 on the upper surface which defines a cavity 83 in the lower portion of the cell over which the cover to be tested is placed. A bore 84 through the base communicates with the cavity 83 and is aligned with the fitting 70 secured in an aperture in the support member 76. A shaft 85 is slidably received in the bore 80 of the gooseneck and includes at the lower end thereof a disk 86 having a depending rim 87 at the outer edge. A stair-step circular cutout is provided in the under side of the disk 86 and includes a first circular cutout 88 and a second circular cutout 89 of a lesser diameter and disposed above the first portion. An annular notch is provided in the rim 87 and a second annular notch is provided adjacent the circular portion 89. O-rings 90 and 91 are secured in the notches and engage the upper surface of base 81 and the circular rim 82 respectively to hermetically seal the cell in the closed position. In the closed position, with a cover clamped between rim 82 and O-ring 91, a second upper cavity 92 is defined in the disk 86. A vertical bore 93 is formed in the disk 86 which communicates with cavity 92 and extends upwardly into the shaft 85 where it intersects a horizontally disposed bore 94. A conduit 95 communicates with the bore 94 and is connected thereto by conventional fitting 96.

The cell of each test unit must be opened and closed to insert and remove the cover being tested under high pressure. To carry out this operation, the shaft 85 is reciprocated in the bore 80 between the open position illustrated in FIGURE 3 and the closed position illustrated in FIGURES 4 and 5. The shaft 85 terminates adjacent the base of the disk 86 in a hexagonal portion 97 with a fillet section securing the disk to the hexagonal portion. A sleeve 98 is mounted on the shaft above the hexagonal portion 97 and is fixedly secured thereto as by welding or the like. Vertically spaced above the sleeve 98 is a second sleeve 99 which is rigidly attached to the underside of the horizontal portion of the gooseneck 78, and is vertically aligned with the bore 80 through which the shaft 85 moves. On either side of the sleeve portion 98 is a link 100 which is pivotally mounted by pin 101 in trunnion fashion and extends upwardly from the point of pivotal connection on the sleeve. A pair of bell cranks 102 are pivotally connected by pins 103 to the sleeve 99 in trunnion fashion and are additionally pivoted to the links 100 by pins 104 at the angle of the bell crank. Both bell cranks are interconnected by a cross-link 105 for concurrent actuation. A roller 106 is rotatably mounted on the free end of the bell crank nearest the cam surface 20 and rides in the cam slot 21. Thus, vertical movement of the roller in the cam slot actuates the linkage 100, 102 which controls vertical movement of the shaft 85 and thereby effects opening and closing of the cell. Fixedly secured to one of the links 100 is an outwardly projecting strip 107 which includes a nut portion 108 fastened at the free end thereof and a threaded bolt 109 which serves as an adjustable stop member in the closed position of the cell by contacting the adjacent bell crank, as seen in FIGURE 5. As is also seen in FIGURE 5, lines drawn along the axis of the bell crank between the pivot point 103 and 104 and a second line drawn along the axis of the link 100 between the pivot point 101 and 104 to the bell crank intersect at an angle with respect to the line drawn between the pivot point 101 and 103 when the cell is fully closed, and thus the bell crank and link move to an over center position when the bolt 109 contacts bell crank 102 to lock the cell in the closed position.

The conduit 95 which communicates with the upper cavity 92 of the cell member includes a conventional fitting 113 which connects the conduit to a pressure relief valve 114 which is of a well-known type that allows the escape of excessive high-pressure gas over a preset quantity. A conventional fitting 115 connects the relief valve to an L-shaped bore 116 in the rotary valve 34. As is shown in FIGURE 3, the rotary valve 34 contains a plurality of such L-shaped apertures or bores, each of which communicates with the cell of its respective testing unit. The L-shaped bore 116 communicates directly with the interface between the rotary valve 34 and the stationary valve 30. Thus, it is apparent that as the valve 34 is rotated about the axis defined by shaft 23, the pressure changes which occur in the upper cavity 92 of the cell are programmed by the configuration of the face of the stationary valve 30. The face of stationary valve 30 includes a series of closely spaced apertures 117 having a common radius on the axis defined by shaft 23 which pass through the valve member to the atmosphere. Spaced clockwise from the apertures 117 at a substantial angular distance therefrom on the face of valve 30 is a vertically disposed bore 118. A transducer 120 or other similar apparatus which converts volumetric gaseous quantities into equivalent electric signals is provided in the bore 118 which is communicable with the bore 116 when the two are aligned. Spaced angularly counterclockwise from the bore 118 is an upwardly opening slot 119 which opens to the atmosphere. An electric conductor 121 is suitably connected to the transducer 120 and interconnects the latter member to a conventional amplifier 122 so that electric signals generated by the transducer are amplified for further use in the testing apparatus. It should be observed from studying the face of the stationary valve 30 that a considerable dwell period exists in the angular distance between the apertures 117 and the bore 118 so that a lapse of time, depending on the rotational speed of the valve 34, occurs between the time the cavity 92 is exposed to atmospheric pressure via the bores 117 and the time that the transducer in bore 118 is aligned with the bore 116 to sense any pressure buildup in the cavity 92.

The amplifier 122 is of a well-known type used to receive a milliampere signal and amplifies same and then transmits it to another station. A conductor 123 interconnects the amplifier to a solenoid controlled valve assembly 124 which is of the type which receives an electric signal to control the flow of gas supplied to the valve. The solenoid valve is mounted on a horizontally disposed brace 125 wihch is rigidly mounted on an upright stanchion member 126, as is best seen in FIGURE 4. Gas is supplied to the solenoid valve arrangement 124 via a conduit 127 from a source (not illustrated). A conduit 128 connected to the outlet port of the valve conveys the flow of gas received and controlled by the solenoid valve to an air cylinder 129 pivotally mounted on the brace 125. The cylinder includes a piston 130 connected to bell crank 131, the latter member being pivotally connected to the horizontal brace 125 adjacent a suitably positioned opening therein. A memory wheel 133, best seen in FIGURES 4 and 6, is mounted on shaft 56 and is vertically spaced beneath the opening in the horizontal brace 125. A plurality of vertically movable pins 134 are angularly spaced about the wheel near the edge and at a radial distance from the shaft 56 which will place them beneath the free end of bell crank 131 as the wheel is rotated. Each pin 134 is provided with a pair of spaced circumferential detents 135 and 136. Suitably mounted in the memory wheel 133 adjacent each of the pins 134 is a garter spring 137 which is adapted to engage one or the other detents to retain the pin in a fixed position with respect to memory wheel 133. Only a slight axial force need by applied to the pin 134 at the upper end thereof to move the pin downwardly from a raised position when the spring member 137 engages the detent 135 to a lowered position when the spring member 137 engages the detent 136. Each pin is designed to be moved from the raised position to the lower position by a downward force exerted by bell crank 131 against the top of the pin when the cylinder 129 is actuated. Actuation of the cylinder is, of course, effected when the transducer 120 senses a buildup of pressure in the cavity 92 of the cell and transmits an electric signal to the amplifier 122 which actuates the solenoid valve 124 to direct a flow of gas to the cylinder. It should also be appreciated that the memory wheel 133 rotates in timed relationship with the movement of the rotary valve bore 116 of each test unit so that as one of the bores 116 aligns with the bore 118 which mounts the transducer, one of the pins 134 is aligned with the bell crank 133 so that a buildup of pressure in the cell sensed by the transducer will result in the instantaneous movement of the bell crank 131 to depress the aligned pin 134 to its lower position. Conversely, if no buildup of pressure is sensed by the transducer 120, no movement of the bell crank 131 takes place. This latter operation, therefore, serves to record the results of any leakage which might occur due to seepage of high-pressure gas through the cover placed in the cell between cavity 83 and 92 and sensed by the transducer. After maintaining high pressure on the cover in the cavity 83, which incidentally causes the cover to flex upwardly, the pressure is released when the spool valve 65 engages the cam member 75 and is moved to the exhaust position of FIGURE 3. The inlet port 61 is thus closed and the high-pressure gas in cavity 83 drains back through port 63 to the atmosphere through drain port 64.

Thereafter, it is desired to remove the cover from cell and sort it according to the results of the test recorded by the memory wheel 133. The cell is opened by upward movement of shaft 85 induced by the roller 106 following an upward path in cam slot 21 to break the over center latch position of the linkage 100, 102 and move the shaft up. The support member 76 rotates the cell of the test unit into a position adjacent the sorting apparatus 12, best seen in FIGURE 6, and a pair of skimming wedges 138 and 139 lift the cover off the rim 82 of circular portion 83 and place it onto circular guide member 140 having a path defined by the upstanding arcuate flanges 141 and 142. A disk 168 fixedly secured to the shaft 56 is juxtaposed beneath the circular guide 140 and includes a plurality of spaced upstanding pins 169 which engage the covers as they are removed from the moving cells and advance them along the path defined between the flanges. It should be observed that a radial line drawn from the axis defined by shaft 56 to the pins 134 could be extended further outwardly and a pin 169 on the disk 168 would align with each of these radial lines. This, of course, means that each memory pin represents the recorded results of the tested cover being advanced by the radially aligned pin 169.

An arcuate section 143 having a curved upstanding flange 170 similar to flange 141 is aligned with the circular guide 140 and is retained in this aligned position by a blade member 144 on which the arcuate section is maintained by brads 145 or the like. The blade 144 is mounted on the circular guide portion 140 for pivotal movement by a pin 146. The blade 144 is normally retained in the position illustrated in FIGURE 6 with flange 170 arcuately aligned with flange 141 by suitable biasing means such as a torsion spring (not shown) suitably mounted on the pin 146. An arm portion 147 on the blade extends inwardly and has mounted on the free end a cam 148 which lies in the path of travel of a depressed pin 134 on the memory wheel and is engageable by this pin. Thus, when the pin 134 has been depressed, indicating a leaky cover, and engages the cam 148 the arm is swung in a counterclockwise direction and the flange 170 is moved out of alignment with flange 141 of the path of travel defined by the circular guide. The movement of the cover along the circular path defined by the flanges 141 and 142 imparts an outward centrifugal force to the cover and by moving the arcuate section 143 out of alignment with the path defined by 141, this force is sufficient to move or direct the cover to the reject chute 149. In the event that the pin is not depressed, indicating the cover is leak-proof, the cover will continue to follow the path defined by the circular guide 140 and arcuate flange 170 into the leak-proof cover chute 150. After the sorting operation is completed, the pin is reset to its raised position by cam 151, best seen in FIGURE 7. The reset cam 151 is mounted on a flange portion 152 on disk member 153.

Figure 2:
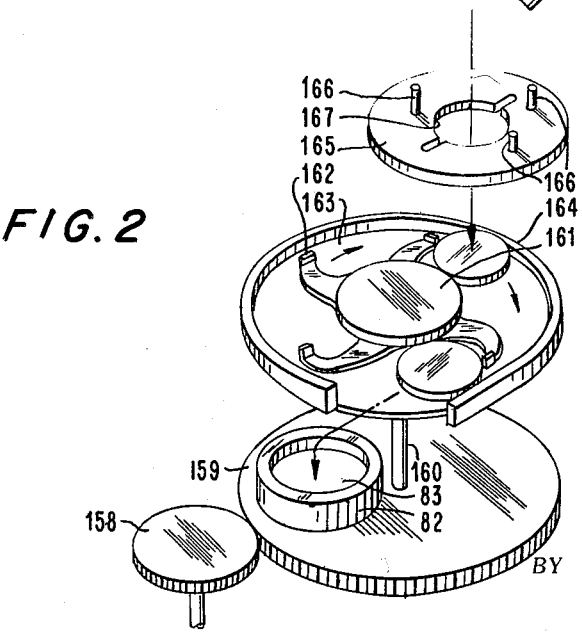
FIGURE 2 is a schematic illustration of the feeding apparatus of the present invention.

Also mounted on the shaft 56 and driven in timed relation to the other rotating elements is a spur gear 157 which drives another spur gear 158. The gear 158 meshes with spur gear 159 which drives the feeding apparatus 11 of the present invention, as is best seen in FIGURE 2. Spur gear 159 is fixedly secured to shaft 160 which projects upwardly and to which is fastened a star wheel 161. The star wheel includes outwardly projecting arm portions 162 which are used to move the covers to be tested into position over the rim 82 of each cell. A fixed horizontal disk 163 lies in juxtaposed relation beneath the star wheel 161 and includes an upwardly projecting arcuate lip 164 along the edge which has an opening at a point adjacent the path of travel of the rim 82 of each test unit on the support 76. Covers are supplied to the star wheel feed assembly 11 by placing a stack of such covers between upwardly projecting posts 166 on ring 165 to direct the flow of covers by gravity through the aperture 167 in the ring to be driven by the star wheel. The described feed apparatus is of a well-known type in the cover testing industry and is set forth herein for illustrative purposes only, since it does not comprise a part of the claimed invention.

OPERATION

Having thus described the physical apparatus of the present invention, a detailed description of the operation of this apparatus will now be set forth.

Referring to the top view of FIGURE 1 and to the projection view of FIGURE 8, it is seen that the feeding apparatus 11 directs the insertion of covers into the cells of the various test units angularly spaced about the support member 76. Immediately after insertion of the cover into the cell from the feed apparatus, the roller 106 on the linkage 100, 102 follows the downward path of the cam slot 21 of arcuate cam 20 over the path defined in section D in FIGURE 8. The linkage then swings to the over center locked position of FIGURE 5 and the cover is clamped in the cell between cavities 83 and 92. Once the roller has passed the open end of the cam slot, the spool valve 65 encounters cam 75 and the cylindrical spool is moved to the test position illustrated in FIGURE 4. High-pressure gas passes from manifold 44 through the spool valve to the lower cavity 83 of the cell. At the same instant the spool valve is shifted to the test position, the bore 116 is in vertical alignment with the aperture 117 on stationary valve 30. Thus, the upper cavity 92 is open to the atmosphere and is at an atmospheric pressure. Since the high-pressure gas used for this test is of a sufficient intensity to flex the cover in the cell upwardly into the upper cavity 92, a buildup of pressure occurs due to the decreased volume within this cavity. However, this buildup of pressure is passed to the atmosphere through the alignment of the bore 116 with the apertures 117. Since the transducer 120 of this invention is a highly sensitive device, any such buildup of pressure would be sensed and taken as a leak in the cover, so it is important that the upper cavity be purged to atmospheric pressure simultaneously with the flexing of the cover induced by the entry of high-pressure gas in the lower cavity 83. Having compensated for flexing of the cover, the bore 116 abuts the solid smooth face of the stationary valve 30 throughout the rotation of the test cell on support member 76 around the area viewed in FIGURE 1 and just prior to the time roller 106 again encounters cam slot 21, this time in the section defined as A in FIGURE 8. Prior to the entry of roller 106 into cam slot 21 at the open end in section A, bore 116 aligns with bore 118, having the transducer 120 at the upper end thereof. Any buildup of pressure in the upper cavity 92 due to seepage of gas through the walls of the cover is sensed by the transducer and instantly passed to the amplifier to be sent to the solenoid valve 124 to actuate the pin depressing assembly of the recording apparatus. Once this sequence of events has taken place, the spool valve 65 engages the cam 71 and is shifted to the exhaust position of FIGURE 3. The high-pressure gas contained in the lower cavity 83 drains through the bore 63 and out drain port 64 to the atmosphere. At the same time, the upper cavity 92 is reduced to atmospheric pressure due to the alignment of bore 116 with the slot 119.

In FIGURE 9, an alternative embodiment is set forth which provides an arcuately formed slot 119 which communicates with a bore 168 disposed vertically in stationary valve 30. A source of gas under low pressure is provided through conduit 169 which is appropriately aligned with the bore 168. This low-pressure source of gas is designed to overcome any partial vacuum which might occur between the tested cover and the upper cavity 92 as the cell is moved to the open position. Accordingly, the low-pressure gas insures that the cover will remain on the rim 82, rather than being lifted with the upward movement of the disk 86 as the cell is opened due to the presence of a vacuum in the upper portion thereof.

Immediately after the bore 116 encounters the slot 119, the roller 106 engages the upwardly inclined cam slot 21 at the area A and the over center latch position of the linkage is broken. The shaft 85 is shifted upwardly to open the cell and allow removal of the cover therefrom by the stripping wedges 138 and 139 so that the leaky covers may be sorted from the leak-proof covers by the sorting apparatus 12.

Although one embodiment of the present invention has been herein illustrated and described, it will be evident to those skilled in the art that various modifications may be incorporated into the details of production without departing from the principles herein set forth.

What is claimed is:

1. Apparatus for testing covers comprising a cell adapted to receive a cover whereby said cover divides said cell into first and second sections; means for injecting high-pressure gas into said first section; first valve means capable of withstanding extremely high gas pressures interposed between said supply means and said first section to control the gas injection; second separate valve means for connecting said second section to atmospheric pressure and subsequently isolating said second section from atmospheric pressure; pressure relief means interposed between said second section and second valve means to shunt excessive gas pressure from said second valve means; said first and second valve means being synchronized to effect gas injection and connection to atmospheric pressure whereby concurrently said cover is induced to flex and thereby obviates any buildup of pressure in said second section other than gas leakage through said cover; sensing means communicable through said second valve means to detect pressure buildups due to leakage into said second section while isolated from the atmosphere; means for discharging said gas from said first section; and sorting means responsive to said sensing means for ejecting leaky covers.

2. Apparatus according to claim 1 wherein said sorting means includes a recording means operatively associated with said sensing means to record leaks in said cover, and means responsive to said recording means for ejecting a leaky cover.

3. Apparatus according to claim 1 wherein said first valve means is programmed to direct the gas into said first section concurrently with the connecting of the second section to the atmosphere and to communicate said discharge means with said first section after the sensing means tests the cover to evacuate the gas therefrom.

4. Apparatus according to claim 1 wherein said second valve means is programmed to connect said second section with the atmosphere concurrently with the introduction of high-pressure gas to said first section, to close said second section for a predetermined period to permit pressure buildup through leaky covers and to expose the second section to said sensing means to sense any buildup in pressure.

5. Apparatus according to claim 1 including means for introducing low-pressure gas into said second section to assist in removing said cover from said cell.

References Cited

UNITED STATES PATENTS

| | | | |
|---|---|---|---|
| 1,359,799 | 11/1920 | Gerhardt | 73—45.1 |
| 1,871,935 | 8/1932 | Williams et al. | 73—45.1 |
| 2,278,804 | 4/1942 | Stuard | 73—45.3 |
| 2,330,229 | 9/1943 | Maher | 73—45.2 |
| 2,696,107 | 12/1954 | Blaing-Leisk | 73—45.2 |
| 2,773,380 | 12/1956 | Hoyne | 73—45.2 |
| 2,833,141 | 5/1958 | Holm. | |
| 3,135,575 | 6/1964 | Breidenbach et al. | 73—45.1 XR |
| 3,198,004 | 8/1965 | Roberts et al. | 73—45.1 |

LOUIS R. PRINCE, Primary Examiner

WILLIAM A. HENRY II, Assistant Examiner